United States Patent
Zhang

(10) Patent No.: US 10,287,941 B2
(45) Date of Patent: May 14, 2019

(54) ENGINE EXHAUST SYSTEM CONTROL

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 15/252,077

(22) Filed: Aug. 30, 2016

(65) Prior Publication Data
US 2018/0058287 A1    Mar. 1, 2018

(51) Int. Cl.
| | | |
|---|---|---|
| F01N 3/022 | (2006.01) | |
| F01N 13/08 | (2010.01) | |
| F02B 37/18 | (2006.01) | |
| F01N 3/20 | (2006.01) | |
| B60T 17/02 | (2006.01) | |
| B60T 13/52 | (2006.01) | |

(52) U.S. Cl.
CPC ............ *F01N 3/2006* (2013.01); *B60T 17/02* (2013.01); *F01N 13/087* (2013.01); *F02B 37/183* (2013.01); *B60T 13/52* (2013.01); *F01N 2410/06* (2013.01); *Y02T 10/144* (2013.01)

(58) Field of Classification Search
CPC ...... F02B 37/18; F02B 37/183; F02B 37/186; F01N 3/2006; F01N 13/087; F01N 2410/06; B60T 17/02; B60T 13/52
USPC .......... 60/602, 280, 274, 287–289, 323–324; 180/65.6, 65.235; 417/187
See application file for complete search history.

(56) References Cited

U.S. PATENT DOCUMENTS

| | | | | |
|---|---|---|---|---|
| 5,005,550 A | * | 4/1991 | Bugin, Jr. ............ | F02M 25/089 123/520 |
| 8,196,686 B2 | * | 6/2012 | Grieve ..................... | B60K 6/12 180/65.235 |
| 8,234,865 B2 | | 8/2012 | Andrews | |
| 8,555,636 B2 | * | 10/2013 | Schwarzenthal ....... | F02B 37/18 60/605.1 |
| 9,157,363 B2 | * | 10/2015 | Wade ..................... | F01N 3/2006 |
| 9,957,867 B2 | * | 5/2018 | Zhang ................... | F02B 37/183 |
| 2007/0295303 A1 | * | 12/2007 | Hirooka .................. | B60T 17/02 123/339.23 |

(Continued)

FOREIGN PATENT DOCUMENTS

| | | | | | |
|---|---|---|---|---|---|
| GB | 2319736 A | * | 6/1998 | ........... | F01N 3/2006 |
| JP | 60019910 A | * | 2/1985 | ........... | F01N 3/2006 |

(Continued)

OTHER PUBLICATIONS

Zhang, Xiaogang, "Method and System for Emissions Reduction," U.S. Appl. No. 15/081,040, filed Mar. 25, 2016, 51 pages.

(Continued)

*Primary Examiner* — Thai Ba Trieu
(74) *Attorney, Agent, or Firm* — Julia Voutyras; McCoy Russell LLP

(57) ABSTRACT

Methods and systems are provided for expediting catalyst warm-up. In one example, a method may include flowing exhaust gas from an engine first through an emission control device and then through a turbine to rotate the turbine in a reverse direction, the rotation of the turbine in the reverse direction generating intake manifold vacuum for a vacuum consumer via a compressor coupled to the turbine. In this way, heat loss through a turbine may be avoided.

18 Claims, 4 Drawing Sheets

(56) References Cited

U.S. PATENT DOCUMENTS

| | | | |
|---|---|---|---|
| 2008/0264059 A1* | 10/2008 | Hirooka | B60T 13/52 60/547.1 |
| 2008/0267789 A1* | 10/2008 | Hirooka | B60T 17/02 417/187 |
| 2009/0043477 A1* | 2/2009 | Oi | F02D 9/02 701/103 |
| 2010/0155157 A1* | 6/2010 | Grieve | B60K 6/12 180/65.6 |
| 2014/0053547 A1* | 2/2014 | Wade | F01N 3/2006 60/602 |
| 2014/0053549 A1* | 2/2014 | Scholt | F02B 33/00 60/602 |
| 2014/0060006 A1 | 3/2014 | Ruona et al. | |
| 2014/0165931 A1* | 6/2014 | Pursifull | F02M 35/10229 123/2 |
| 2018/0023450 A1* | 1/2018 | Zhang | F02B 37/186 60/602 |
| 2018/0073444 A1* | 3/2018 | Zhang | F01N 3/2006 |

FOREIGN PATENT DOCUMENTS

| | | | | |
|---|---|---|---|---|
| JP | 05321643 A | * | 12/1993 | ........... F01N 3/2006 |
| JP | 201611632 A | * | 1/2016 | |
| WO | WO-2009145002 A1 | * | 12/2009 | ........... F01N 3/2006 |

OTHER PUBLICATIONS

Zhang, Xiaogang, "Method and System for Exhaust Aftertreatment," U.S. Appl. No. 15/218,639, filed Jul. 25, 2016, 94 pages.

* cited by examiner

ENGINE EXHAUST SYSTEM CONTROL

FIELD

The present description relates generally to methods and systems for controlling a vehicle engine to rapidly heat an emission control device.

BACKGROUND/SUMMARY

Engines may be operated with boosted aircharge provided via a turbocharger wherein an intake compressor is driven by an exhaust turbine. However, placing a turbine in an exhaust system can increase engine cold-start emissions due to the turbine acting as a heat sink. In particular, engine exhaust heat during the engine cold-start may be absorbed at the turbine, lowering the amount of exhaust heat that is received at a downstream exhaust catalyst. As such, this delays catalyst light-off. Consequently, spark retard may be required in order to activate the exhaust catalyst. However, the fuel penalty associated with the spark retard usage may offset or even outweigh the fuel economy benefit of the boosted engine operation.

Accordingly, various approaches have been developed to expedite the attainment of a catalyst light-off temperature during cold-start conditions in a boosted engine. One example approach, shown by Andrews in U.S. Pat. No. 8,234,865 involves routing exhaust gas towards an exhaust tailpipe via a passage that bypasses the exhaust turbine during cold-start conditions. A passive, thermatically operated valve is used to regulate the flow of exhaust through the passage, the valve opening during low-temperature conditions (such as during cold-start). The thermatically operated valve comprises a bi-metallic element which distorts based on temperature thereby regulating the opening of the valve. By circumventing the turbine, exhaust heat may be directly delivered to the exhaust catalyst.

However, the inventors herein have recognized potential issues with such systems. As one example, after catalyst light-off, the temperature of the unobstructed exhaust reaching the catalyst may be higher than desired. In particular, owing to a coating on the catalyst surface (such as on the surface of an exhaust oxidation catalyst or three-way catalyst), the catalyst may have higher conversion efficiencies at lower exhaust temperatures. As a result, the higher than desired temperature of exhaust reaching the catalyst may result in reduced catalyst functionality.

The inventors herein have identified an approach by which the issues described above may be at least partly addressed. One example method includes flowing exhaust gas from an engine first through an emission control device and then through a turbine to rotate the turbine in a reverse direction, the rotation of the turbine in the reverse direction generating intake manifold vacuum for a vacuum consumer via a compressor coupled to the turbine.

In this way, the exhaust gas may be first routed through the emission control device before being routed to the turbine, thus expediting catalyst warm-up. However, the exhaust gas is still routed to the turbine, but in a manner that causes reverse rotation of the turbine. In doing so, intake manifold vacuum may be generated for a vacuum consumer, such as a brake booster. By operating the turbine and compressor in reverse to generate intake manifold vacuum, an intake throttle may be dispensed with, thus lowering system cost and controls complexity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
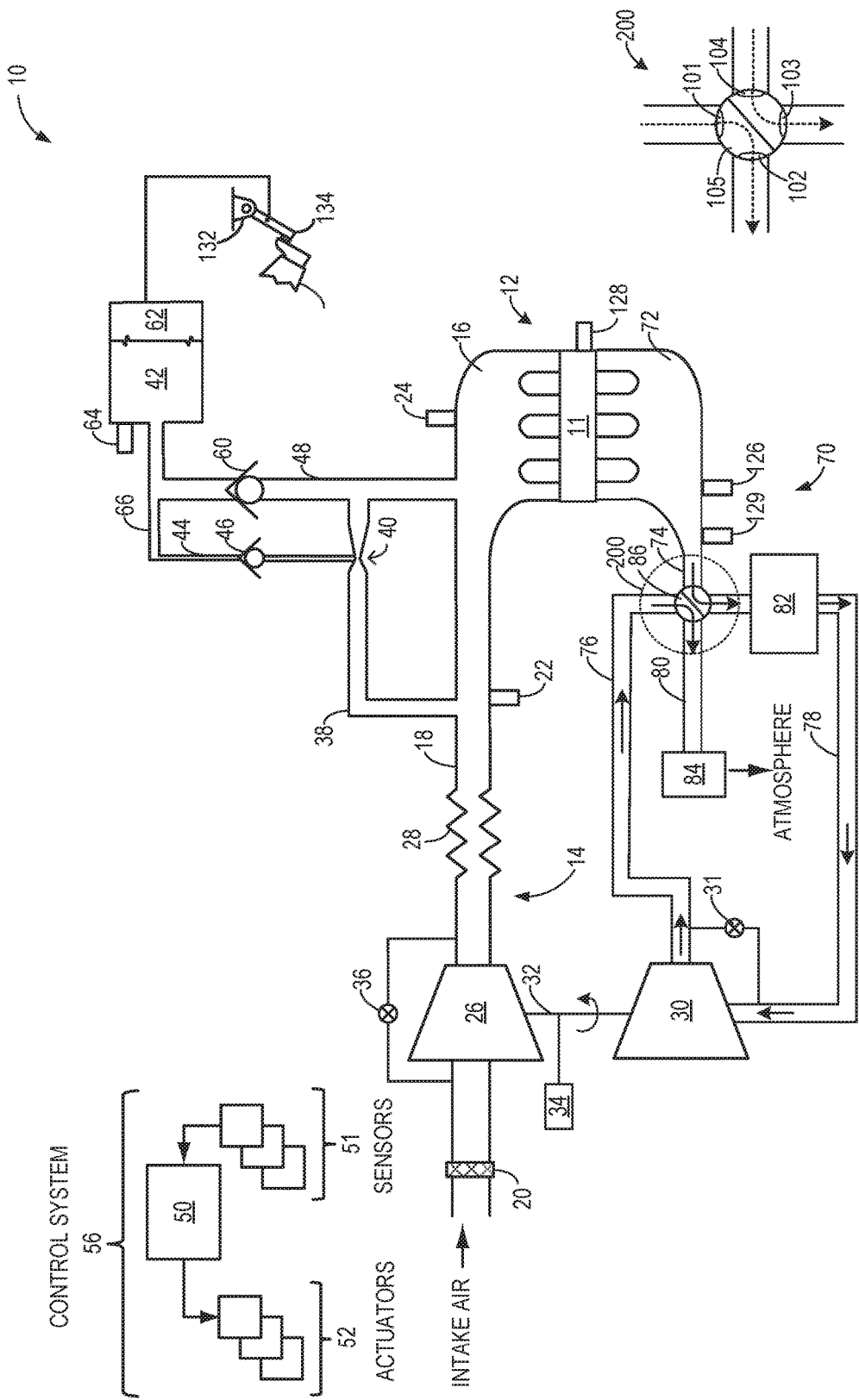
Figure 3:
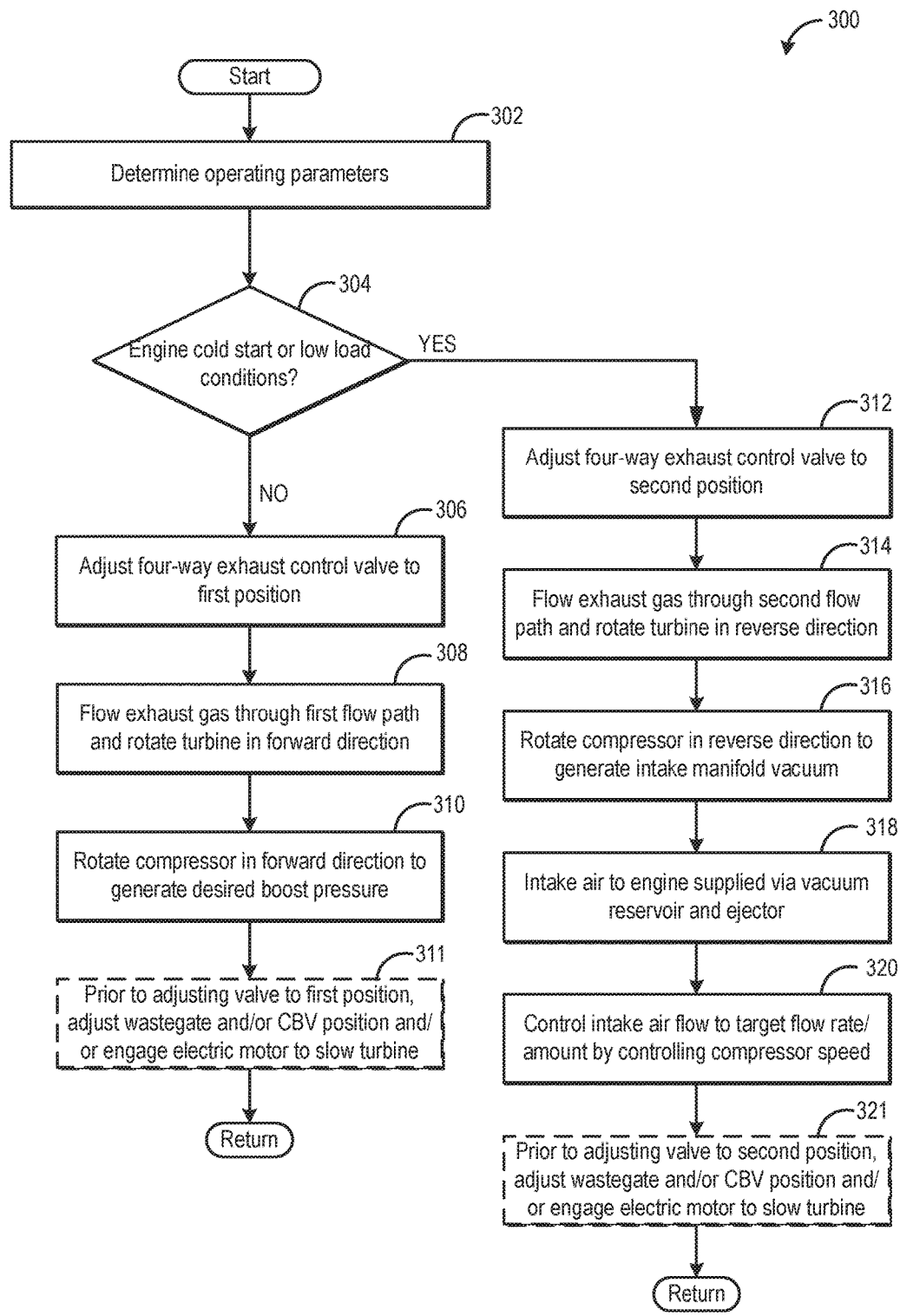
FIG. 3 is a flow chart illustrating a method for operating an engine.

The following description relates to systems and methods for expediting catalyst warm-up while also generating vacuum to replenish a vacuum supply for a vacuum consumer. An engine system, such as the engine system of FIGS. 1A and 2A, may include an exhaust passage with branched flow paths. A turbine may be coupled to the first path and a catalytic converter may be coupled to the second path. A four-way exhaust control valve, such as the valve illustrated in FIGS. 1B and 2B, may be used to control the flow of exhaust gas through the branched passage exhaust passage. As illustrated by the method of FIG. 3 and accompanying timeline of engine operation, during cold start conditions, exhaust may be first routed through the catalyst to increase the catalyst temperature, and then routed through the turbine in a direction opposite to the conventional direction of exhaust flow through the turbine. Due to the opposite direction of exhaust flow, the turbine may rotate in a reverse direction, which may create a higher pressure at the turbine that may facilitate expedited catalyst light-off. Further, the reverse rotation of the turbine causes reverse rotation of the compressor which in turn creates a lower pressure (vacuum) at an ejector. The ejector may draw in air from a vacuum reservoir, such as a reservoir of a brake booster, creating a desired vacuum. During higher load operation, after catalyst light-off, exhaust may be first routed through the turbine and then the catalyst.

Figure 1:
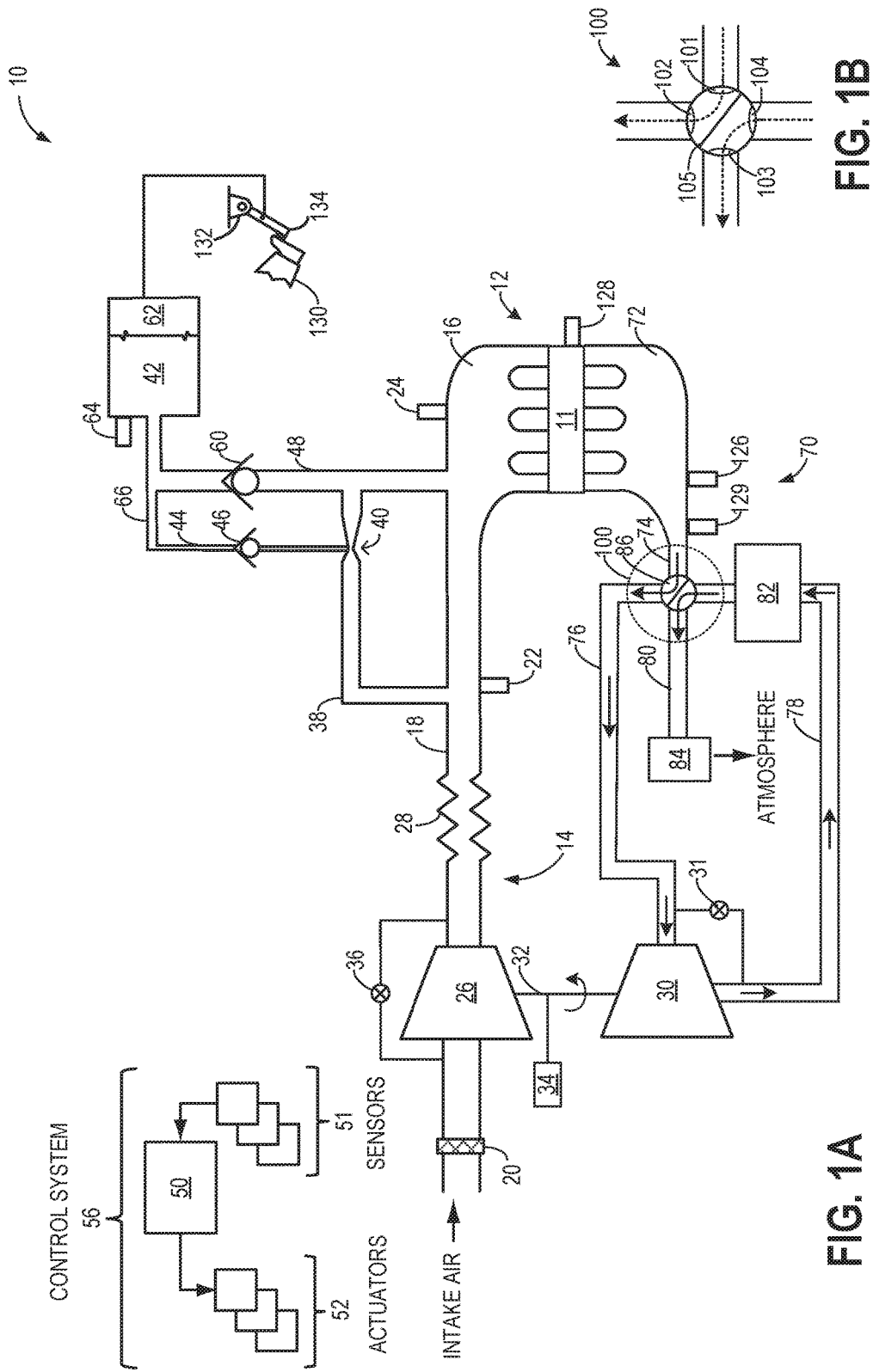
FIGS. 1A and 2A show a schematic depiction of an engine system.
FIGS. 1B and 2B show a detailed schematic depiction of the exhaust control valve of FIGS. 1A and 2A.

Turning to FIG. 1, it shows an example engine system 10 including an engine 12. In the present example, engine 12 is a spark-ignition engine of a vehicle, the engine including a plurality of cylinders 11. Combustion events in each cylinder drive a piston which in turn rotates a crankshaft, as is well known to those of skill in the art. Further, engine 12 may include a plurality of engine valves for controlling the intake and exhaust of gases in the plurality of cylinders.

Engine 12 has an engine intake 14 that includes an engine intake manifold 16 coupled to an intake passage 18. Air may enter intake passage 18 from an air intake system (AIS) including an air cleaner 20 in communication with the vehicle's environment. The intake 14 may include mass flow sensor 22 and a manifold air pressure sensor 24 for providing respective signals MAF and MAP to controller 50.

Engine system 10 is a boosted engine system, where the engine system further includes a boosting device. In the present example, intake passage 18 includes a compressor 26 for boosting an intake aircharge received along intake passage 18. A charge air cooler 28 (or intercooler) is coupled downstream of compressor 26 for cooling the boosted aircharge before delivery to the intake manifold. In embodiments where the boosting device is a turbocharger, compressor 26 may be coupled to, and driven by an exhaust turbine 30, where the compressor is coupled to the turbine via a shaft 32. Further compressor 26 may be, at least in part, driven by an electric motor 34 or the engine crankshaft.

An optional bypass passage may be coupled across compressor 26 so as to divert at least a portion of intake air compressed by compressor 26 back upstream of the compressor. An amount of air diverted through the bypass passage may be controlled by opening a compressor bypass valve (CBV) 36 located in the bypass passage. By controlling the CBV, and varying an amount of air diverted through the bypass passage, a boost pressure provided downstream of the compressor can be regulated. This enables boost control and surge control.

Further, turbine 30 may include a wastegate 31. The wastegate 31 may be coupled across the turbine 30 and may be adjusted to control the speed of the turbine and ultimately the amount of boost pressure provided by the compressor. The wastegate may be opened to allow exhaust gas to bypass the turbine. The wastegate may be electrically, pneumatically, or hydraulically actuated, for example.

A conduit 38, parallel to air intake passage 18, may be configured to divert a portion of the intake air received from downstream of the air cleaner 20 and the compressor 26 to intake manifold 16 via an ejector 40. Conduit 38 may be coupled to air intake passage 18 at a point downstream of charge air cooler 28. Ejector 40 may be an ejector, aspirator, eductor, venturi, jet pump, or similar passive device. In the present example, the ejector is a three port device including a motive inlet, a mixed flow outlet, and a throat/entraining inlet. Ejector 40 has an upstream motive flow inlet via which air enters the ejector. Ejector 40 further includes a neck or entraining inlet communicating with a vacuum reservoir 42 along a first passage 44. Air flowing through the motive inlet may be converted to flow energy in the ejector 40, thereby creating a low pressure communicated to the neck (or entraining inlet) and drawing a vacuum at the neck. Vacuum drawn at the neck of ejector 40 is directed to vacuum reservoir 42 through first check valve 46 located in the first passage 44. The first check valve 46 allows vacuum reservoir 42 to retain any of its vacuum should the pressures in the ejector's motive inlet and the vacuum reservoir equalize. While the depicted embodiment shows first check valve 46 as a distinct valve, in alternate embodiments of the ejector, check valve 46 may be integrated into the ejector.

Ejector 40 further includes a downstream mixed flow outlet via which air that has passed through ejector 40 can exit and be directed to intake manifold 16. As such, intake manifold 16 is also coupled to vacuum reservoir 42 along second passage 48. Check valve 60 in second passage 48 allows vacuum generated at the intake manifold to be directed to vacuum reservoir 42 but does not allow air flow from the intake manifold to the vacuum reservoir. Also, during conditions when air pressure in the intake manifold is higher, check valve 60 does not allow air to flow back through the ejector and into conduit 38, from where the air may be directed back to the intake passage, upstream of compressor 26. Since the vacuum reservoir 42 can receive vacuum directly from intake manifold 16, second check valve 60 allows vacuum reservoir 42 to retain any of its vacuum should the pressure in the intake manifold 16 and the vacuum reservoir equalize. In some embodiments, check valve 60 may be referred to as the bypass path, providing a high flow rate path for air from the vacuum reservoir to the intake manifold. This flow path dominates while reservoir pressure is above manifold pressure. As such, the high pressure point in the depicted system (compressor outlet) may always connect to the ejector inlet and the ejector outlet point may be routed to the low pressure point (intake manifold). In an alternate embodiment, the ejector outlet may be routed to the lowest pressure point via check valves. On a boosted engine, the low pressure point may sometimes be the intake manifold and at other times may be the compressor inlet. In still further embodiments, actively controlled valves may be used in place of the passive check valves if it is cost effective.

Vacuum reservoir 42 may be coupled to one or more engine vacuum consumption devices 62. For example, vacuum consumption device 62 may be a brake booster coupled to vehicle wheel brakes wherein vacuum reservoir 42 is a vacuum cavity in front of a diaphragm of the brake booster. Therein, vacuum reservoir 42 may be an internal vacuum reservoir configured to amplify a force provided by a vehicle operator 130 via a brake pedal 134 for applying vehicle wheel brakes (not shown). A position of the brake pedal 134 may be monitored by a brake pedal sensor 132. In alternate embodiments, the vacuum reservoir may be a low pressure storage tank included in a fuel vapor purge system, a vacuum reservoir coupled to a turbine wastegate, a vacuum reservoir coupled to a charge motion control valve, etc. In some embodiments, as depicted, a vacuum sensor 64 (or pressure sensor) may be coupled to the vacuum reservoir 42 for providing an estimate about the vacuum level at the reservoir. In some examples, a motive flow control valve may be coupled upstream of ejector 40 in conduit 38. The motive flow control valve may be adjusted to vary a motive flow (amount and/or rate) through the ejector.

As shown at FIG. 1A, a neck of the ejector 40 is coupled to the vacuum reservoir 42 along first passage 44, while an outlet of the ejector 40 is coupled to the vacuum reservoir 42 along second passage 48. Each of the first and second passages may then merge at third passage 66, downstream (in the direction of flow) of an outlet of the vacuum reservoir. Each of the first and second passages includes respective check valves to control flow direction to/from the reservoir. The second passage 48 further couples the vacuum reservoir 42 to the engine intake manifold 16 downstream (in the direction of flow) of a juncture with the ejector outlet.

Engine system 10 further includes an engine exhaust 70. The engine exhaust 70 includes an exhaust manifold 72 leading to a branched exhaust passage 74 that ultimately routes exhaust gas to the atmosphere. The branched exhaust passage 74 includes a first branch 76, a second branch 78, and a third branch 80. The engine exhaust 70 may include one or more emission control devices 82, which may be mounted in the second branch 78. One or more emission control devices may include a three-way catalyst, lean NOx trap, diesel particulate filter, oxidation catalyst, etc. A muffler 84 or other exhaust-silencing device is positioned in the third branch 80. The muffler 84 is then coupled to atmosphere.

The engine exhaust 70 includes the turbine 30 positioned at the first branch 76. The turbine includes an inlet coupled to the first branch 76 and an outlet coupled to the second branch 78. As used herein, the turbine inlet refers to an opening in the housing of the turbine or other structure that is configured to admit exhaust gas and supply the admitted exhaust gas to a turbine rotor when the turbine is operated in a standard, forward-rotating mode. The turbine outlet refers to an opening in the housing of the turbine or other structure that is configured to discharge exhaust gas from the turbine rotor to a coupled exhaust passage when the turbine is operated in the standard, forward-rotating mode. While not shown in FIG. 1A, a wastegate may be provided to allow exhaust gas to bypass the turbine, for example during high engine load conditions.

Flow through the branched exhaust passage 74 is controlled by a four-way exhaust control valve 86 located at a junction between the first branch 76, second branch 78, and third branch 80. The four-way exhaust control valve 86 includes four ports and a divider (described in more detail below), enabling two separate flow paths through the control valve. The four-way exhaust control valve 86 may be moved between a first position and a second position by an actuator responsive to a signal sent from the controller 50. The actuator may be an electric actuator, hydraulic actuator, pneumatic actuator, or the like.

The engine system 10 may further include a control system 56. Control system 56 is shown receiving information from a plurality of sensors 51 (various examples of which are described herein) and sending control signals to a plurality of actuators 52 (various examples of which are described herein). As one example, sensors 51 may include exhaust gas sensor 126 located upstream of the emission control device, temperature sensor 128, pressure sensor 129, MAF sensor, and MAP sensor. Other sensors such as pressure, temperature, air/fuel ratio, and composition sensors may be coupled to various locations in the engine system 10. As another example, the actuators may include fuel injectors (not shown), valve 86, and electric motor 34. The control system 56 may include a controller 50. The controller may receive input data from the various sensors, process the input data, and trigger the actuators in response to the processed input data based on instruction or code programmed therein corresponding to one or more routines. Example control routines are described herein with regard to FIG. 3.

As shown in FIG. 1A, the four-way exhaust control valve 86 is in a first position. In the first position, fluidic coupling between the exhaust manifold 72 and the first branch 76 at the junction of the exhaust passage branches is established and direct fluidic coupling at the junction between the exhaust manifold 72 and the second branch 78 is blocked. The first position of the valve also establishes fluidic coupling between the second branch 78 and the third branch 80 at the junction.

The first position of the four-way exhaust control valve 86 defines a first flow path through the exhaust system. The first flow path includes exhaust gas from the engine flowing through the exhaust manifold and to the turbine 30 via the first branch 76. The first flow path further includes the exhaust gas from the turbine 30 then flowing to the emission control device 82 via the second branch 78. The first flow path further includes the exhaust gas from the emission control device 82, via the second branch 78, to the third branch 80. From the third branch 80, the exhaust gas travels through the muffler 84 and then to atmosphere.

The first flow path includes the exhaust gas entering the turbine 30 at the inlet of the turbine and exiting the turbine at the outlet of the turbine, thus causing the turbine to rotate in a first, forward direction. This forward rotation is transmitted to the shaft, as shown by the arrow around the shaft 32, and to the compressor, thus causing forward rotation of the compressor. The forward rotation of the compressor draws in fresh air through the air filter and to the compressor, where the air is compressed and then provided to the charge air cooler and the engine. The forward rotation of the compressor acts to increase the intake manifold pressure, thus providing what is known as boost pressure.

A detailed depiction 100 of the four-way control valve 86 in the first position is shown in FIG. 1B. As shown, the valve 86 includes four ports, 101-104, and a divider 105. In the first position, the first port 101 is coupled to the upstream portion of the branched exhaust passage 74 (which is coupled to the exhaust manifold), the second port 102 is coupled to the first branch 76, the third port 103 is coupled to the third branch 80, and the fourth port 104 is coupled to the second branch 78. The divider 105 creates two distinct flow paths within the valve 86, such that the first port 101 is fluidically coupled to the second port 102 and the third port 103 is fluidically coupled to the fourth port 104. Thus, the valve 86 may simultaneously flow exhaust gas through the two separate flow paths.

In this way, when the four-way exhaust control valve is in the first position, exhaust gas may flow to the turbine 30 before flowing to the emission control device 82. This routing of the exhaust gas may allow for maximum boost pressure generation and rapid boost control during transient conditions owing to the direct routing of the exhaust gas to the turbine (e.g., without first passing through the emission control device).

FIGS. 2A and 2B show the engine system 10 with the four-way exhaust control valve 86 in a second position. As shown in FIG. 2A, the four-way exhaust control valve 86 is in the second position. In the second position, fluidic coupling between the exhaust manifold 72 and the first branch 76 at the junction of the exhaust passage branches is blocked and fluidic coupling at the junction between the exhaust manifold 72 and the second branch 78 is established. The second position of the valve also establishes fluidic coupling between the first branch 76 and the third branch 80 at the junction.

The second position of the four-way exhaust control valve 86 defines a second flow path through the exhaust system. The second flow path includes exhaust gas from the engine flowing through the exhaust manifold and to the emission control device 82 via the second branch 78. The second flow path further includes the exhaust gas from the emission control device 82 flowing to the turbine 30 via the second branch 78. The second flow path further includes the exhaust gas from turbine 30 flowing, via the first branch 76, to the third branch 80. From the third branch 80, the exhaust gas travels through the muffler 84 and then to atmosphere.

The second flow path includes the exhaust gas entering the turbine 30 at the outlet of the turbine and exiting the turbine at the inlet of the turbine, thus causing the turbine to rotate in a second, reverse direction. This reverse rotation is transmitted to the shaft, as shown by the arrow around the shaft 32, and to the compressor, thus causing reverse rotation of the compressor. The reverse rotation of the compressor creates vacuum at the intake manifold. The intake manifold vacuum provides a vacuum resource for the ejector 40 to draw air from vacuum reservoir 42, thus supplying air for combustion at the engine and concurrently replenishing the vacuum stored at the vacuum reservoir 42.

A detailed depiction 200 of the four-way control valve 86 in the second position is shown in FIG. 2B. As shown, the valve 86 includes four ports, 101-104, and a divider 105. In the second position, the fourth port 104 is coupled to the upstream portion of the branched exhaust passage 74 (which is coupled to the exhaust manifold), the first port 101 is coupled to the first branch 76, the second port 102 is coupled to the third branch 80, and the third port 103 is coupled to the second branch 78. The divider 105 creates two distinct flow paths within the valve 86, such that the first port 101 is fluidically coupled to the second port 102 and the third port 103 is fluidically coupled to the fourth port 104. Thus, the valve 86 may simultaneously flow exhaust gas through the two separate flow paths.

In this way, when the four-way exhaust control valve is in the second position, exhaust gas may flow to the emission control device 82 before flowing to the turbine 30. This routing of the exhaust gas may avoid heat loss at the turbine, expediting emission control device warm-up. Once the emission control device has reached operating temperature, the four-way control valve may be moved back to the first position, allowing the creation of boost pressure via the compressor. Further, the four-way exhaust control valve may be moved to the second position during other conditions where boost pressure is not desired, such as during engine idle conditions or other low or no load conditions (e.g., deceleration). Additionally, the creation of intake manifold vacuum via the reverse rotation of the compressor when the four-way exhaust control valve is in the second position may replenish the vacuum in one or more vacuum reservoirs for use by one or more vacuum consumers, such as the brake booster.

Because the intake air flow to the engine under non-boosted conditions is provided by the air in the vacuum reservoir and not along the traditional fresh air-intake passage route, an intake throttle may be dispensed with and intake air flow control may be provided by controlling a speed of rotation of the compressor. The compressor speed control may be provided by activation and/or adjustment of the electric motor coupled to the turbocharger shaft (e.g., the speed of the motor and/or the load the motor places on the shaft may be adjusted to control the compressor speed). Other mechanisms for controlling the compressor speed are possible, such as adjustment of a wastegate position.

FIGS. 1A-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning to FIG. 3, a method 300 for operating an engine is illustrated. Instructions for carrying out method 300 and the rest of the methods included herein may be executed by a controller (e.g., controller 50) based on instructions stored on a memory of the controller and in conjunction with signals received from sensors of the engine system, such as the sensors described above with reference to FIG. 1A. The controller may employ engine actuators of the engine system to adjust engine operation, according to the methods described below. For example, as explained below, a four-way exhaust control valve (e.g., valve 86) may be adjusted in order to flow exhaust gas first through a catalyst (e.g., emission control device 82) and then through a turbine (e.g., turbine 30), to rapidly heat up the catalyst, or the valve may be adjusted to flow exhaust gas first through the turbine then through the catalyst to provide rapid boost pressure control.

At 302, method 300 includes determining operating parameters. The determined operating parameters may include but are not limited to engine temperature and/or catalyst temperature, engine speed, engine load, time since an engine start event, operator-requested torque, and other parameters. At 304, method 300 determines if the engine is operating under cold start or low load conditions. Engine cold start conditions may include engine temperature below a threshold (e.g., below operating temperature, such as below 190 degrees F.), the engine being at ambient temperature during start-up, and/or a threshold time not having elapsed since an engine start event. Low load engine conditions may include engine idle, engine load below a threshold load (e.g., below 25% maximum rated engine load), vehicle deceleration, or other suitable conditions.

If the engine is operating with cold start or low load conditions, the method proceeds to 312, which will be explained in more detail below. If the engine is not operating under cold start or low load conditions (e.g., if the engine is warmed up and engine load is in the mid-to-high load range, such as above 25% maximum rated load), method 300 proceeds to 306 to adjust (or maintain) the four-way exhaust control valve to a first position. As explained above with respect to FIGS. 1A and 1B, the four-way exhaust control valve may be positioned at a junction of a branched exhaust passage and may control the direction of exhaust gas flow through the exhaust system. At 308, method 300 includes flowing exhaust gas from the engine through a first flow path and rotating the turbine in a forward direction. The first flow path includes flowing exhaust gas from the engine to the turbine, then from the turbine to the catalyst, and then from the catalyst to a muffler and to atmosphere. The exhaust gas enters the turbine at the turbine inlet and exits the turbine at the turbine outlet.

At 310, method 300 includes rotating the compressor in a forward direction to generate desired boost pressure. The forward rotation of the turbine drives the compressor in the forward direction, which results in compression of the intake air, also referred to as boost pressure. The desired boost pressure may be determined from a look-up table that indexes boost pressure to engine speed and load, for example. The desired boost pressure may be reached by adjusting exhaust flow through the turbine (e.g., by controlling a wastegate position) or other suitable mechanism.

At 311, method 300 optionally includes, prior to adjusting the four-way exhaust control valve to the first position, adjusting a position of the wastegate and/or compressor bypass valve (CBV) and/or engaging the electric motor to slow the turbine rotation. When the four-way exhaust control valve is moved from the second position to the first position during engine operation, exhaust gas may be present in the branched exhaust passages, the turbine and compressor may be rotating in the reverse direction, and compressed air may be present between the compressor and the air filter, for example. Thus, to expedite the change in direction of the rotation of the turbine and compressor, the electric motor may be engaged to slow the turbine down. Such an action may enable more rapid spinning up of the turbine once the four-way exhaust control valve is moved to the first position. Further, by adjusting (e.g., opening) one or more of the wastegate and compressor bypass valve, the speed of the turbine and compressor may be further reduced, and in some examples, excess exhaust gas and/or intake air may be removed from the system. The adjustment of the electric motor, and/or the adjustment of the wastegate and/or CBV may be performed only when transitioning from the second position to the first position during engine operation, in one example. Method 300 then returns.

Returning to 306, if it is determined that the engine is operating under cold start or low load conditions, method 300 proceeds to 312 to adjust the four-way valve to a second position. At 314, exhaust gas flows in a second flow path through the exhaust system and the turbine is rotated in a reverse direction. The second flow path includes flowing exhaust gas from the engine to the catalyst, then from the catalyst to the turbine, and then from the turbine to the muffler and to atmosphere. The exhaust gas enters the turbine at the turbine outlet and exits the turbine at the turbine inlet, thus generating the reverse rotation of the turbine.

At 316, method 300 includes rotating the compressor in a reverse direction to generate intake manifold vacuum. The reverse rotation of the turbine drives the compressor in the reverse direction, which results in evacuation of intake air from the intake system, thus generating the intake manifold vacuum. At 318, method 300 supplies intake air to the engine via a vacuum reservoir and ejector. For example, as explained above with respect to FIGS. 1A and 2A, the intake manifold vacuum provides a vacuum resource for the ejector (e.g., ejector 160), thus drawing air from a vacuum reservoir (e.g., reservoir 42) of a vacuum consumer (e.g., brake booster) and supplying it to the engine.

In some examples, a standard intake air throttle may be dispensed with and intake air flow control may be provided by controlling the speed of rotation of the compressor, as indicated at 320. As explained above, the vacuum generated by the reverse rotation of the compressor draws air from the vacuum reservoir via the ejector, and thus the amount/rate of the air drawn from the reservoir may be adjusted by adjusting the speed of the compressor. The speed of the compressor may be adjusted by activating or adjusting an electric motor coupled to the compressor shaft in one example. For example, the compressor speed may be increased by further rotating the shaft via the electric motor to increase the intake air flow rate. In another example, the compressor speed may be decreased by applying drag to the shaft via the electric motor to decrease the intake air flow rate. In other examples, the compressor speed may be adjusted by adjusting flow through the turbine (e.g., by adjusting a position of a wastegate of the turbine). The intake air flow rate may be adjusted to a target rate that is determined as a function of engine load and speed, operator requested torque, or other parameters.

At 321, method 300 optionally includes, prior to adjusting the four-way exhaust control valve to the second position, adjusting a position of the wastegate and/or compressor bypass valve (CBV) and/or engaging the electric motor to slow the turbine rotation. When the four-way exhaust control valve is moved from the first position to the second position during engine operation, exhaust gas may be present in the branched exhaust passages, the turbine and compressor may be rotating in the forward direction, and compressed air may be present between the compressor and the engine, for example. Thus, to expedite the change in direction of the rotation of the turbine and compressor, the electric motor may be engaged to slow the turbine down. Such an action may enable more rapid spinning up of the turbine once the four-way exhaust control valve is moved to the second position. Further, by adjusting (e.g., opening) one or more of the wastegate and compressor bypass valve, the speed of the turbine and compressor may be further reduced, and in some examples, excess exhaust gas and/or intake air may be removed from the system. The adjustment of the electric motor, and/or the adjustment of the wastegate and/or CBV may be performed only when transitioning from the first position to the second position during engine operation, in one example. Method 300 then returns.

Figure 4:
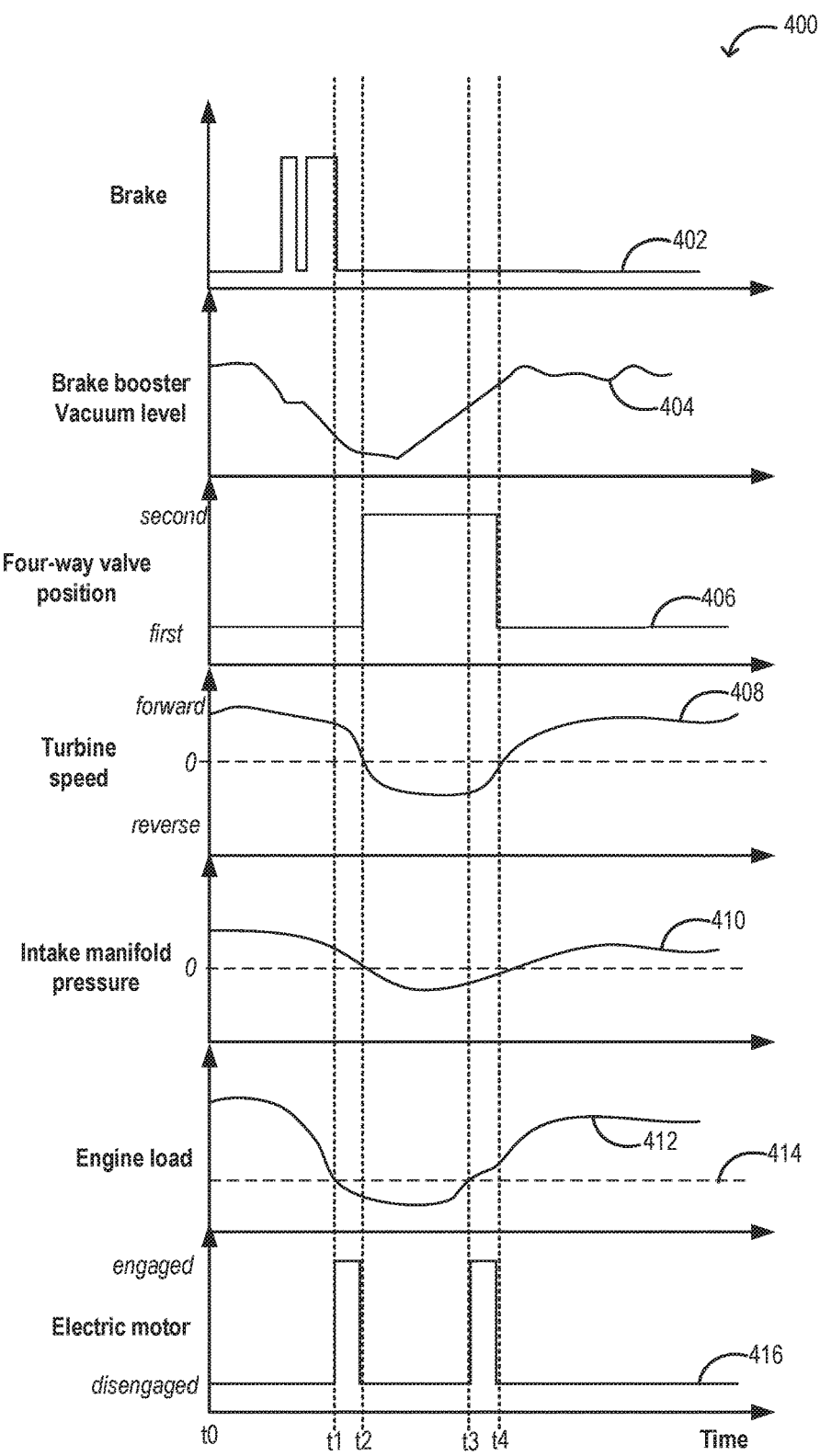
FIG. 4 is a diagram showing example operating parameters that may be observed during execution of the method of FIG. 3.

FIG. 4 is a diagram 400 illustrating operating parameters that may be observed during execution of the method of FIG. 3. Diagram 400 includes brake pedal application at plot 402, changes in a brake booster vacuum level at plot 404, four-way exhaust control valve position at plot 406, turbine rotation direction at plot 408, intake manifold pressure at plot 410, engine load at plot 412, and electric motor engagement at plot 416. The electric motor engagement includes engagement of the electric motor configured to couple to the turbocharger shaft, such as motor 34 of FIGS. 1A and 2A. For each plot, time is depicted along the x-axis and respective values of each operating parameter are depicted along the y-axis.

At time t0, engine load begins at a relative high level and the brake booster vacuum level is relatively high. Owing to the high engine load, the four-way valve is in the first position, causing forward rotation of the turbine. The forward rotation of the turbine causes forward rotation of the compressor, resulting in positive intake manifold pressure. As time progresses toward time t1, the brake pedal is applied to slow the vehicle down to a stop, for example. As such, engine load decreases and the vacuum level in the brake booster decreases.

At time t1, engine load drops below a threshold load. For example, the engine may be idling. Responsive to the engine load dropping below the threshold (shown by line 414), the electric motor is engaged in order to slow the rotation of the turbine. Further, in some examples, the wastegate coupled across the turbine and/or the compressor bypass valve may be opened to reduce boost pressure. By slowing the rotation of the turbine shaft and/or reducing boost pressure in advance of adjusting the four-way exhaust control valve, the reversal in the rotational direction of the turbine and compressor may be performed more rapidly. At time t2, the four-way exhaust control valve is moved to the second position. As a result of the valve in the second position, the turbine begins to operate in the reverse direction. As such, intake manifold pressure decreases to generate intake manifold vacuum, which then supplies vacuum to the brake booster via the ejector (shown by the increase in brake booster vacuum level after time t2). Also at time t2, the electric motor is disengaged in order to allow free rotation of the turbocharger shaft. However, in some examples, between time t2 and t3, the motor may be engaged to control compressor speed, if indicated. At time t3, the engine load increases above the threshold load, and the electric motor is again engaged to slow the rotation of the turbine. At time t4, the electric motor is disengaged and the four-way exhaust control valve is moved back to the first position, resulting in forward rotation of the turbine and generation of boost pressure.

The technical effect of flowing exhaust gas from an engine first through a catalyst and then through a turbine to rotate the turbine in a reverse direction is that the rotation of the turbine in the reverse direction generates intake manifold vacuum for a vacuum consumer via a compressor coupled to the turbine. A further technical effect is avoiding heat loss at the turbine and supplying hot exhaust gas to the catalyst.

An embodiment of a method comprises flowing exhaust gas from an engine first through an emission control device and then through a turbine to rotate the turbine in a reverse direction, the rotation of the turbine in the reverse direction generating intake manifold vacuum for a vacuum consumer via a compressor coupled to the turbine. In a first example of the method, the flowing exhaust gas from the engine first through the emission control device and then through the turbine to rotate the turbine in the reverse direction is performed responsive to a first condition, and the method further includes, responsive to a second condition, flowing exhaust gas from the engine first through the turbine to rotate the turbine in a forward direction and then flowing the exhaust gas through the emission control device, the rotation of the turbine in the forward direction generating intake boost pressure via the compressor. In a second example, the method optionally includes the first example and further includes wherein the first condition comprises one or more of an engine cold start and engine load below a threshold load and wherein the second condition comprises engine load greater than the threshold load. In a third example, the method optionally includes one or both of the first example and second example and further includes wherein flowing the exhaust gas from the engine first through the turbine and then through the emission control device comprises flowing the exhaust gas through the four-way exhaust flow control valve in a first position, and wherein flowing the exhaust gas from the engine first through the emission control device and then through the turbine comprises flowing the exhaust gas through a four-way exhaust flow control valve in a second position. In a fourth example, the method optionally includes one or more of the first through third examples and further includes during the first condition, flowing the exhaust gas from the turbine, then through a muffler, and then to atmosphere, and during the second condition, flowing the exhaust gas from the emission control device, then through the muffler, and then to atmosphere. In a fifth example, the method optionally includes one or more of the first through fourth examples and further includes wherein generating intake manifold vacuum for the vacuum consumer comprises generating intake manifold vacuum for a brake booster, wherein the rotation of the turbine in the reverse direction also rotates the compressor in a reverse direction, the rotation of the compressor in the reverse direction drawing air from the brake booster via an ejector. In a sixth example, the method optionally includes one or more of the first through fifth examples and further includes controlling intake air flow by controlling a speed of rotation of the compressor. In a seventh example, the method optionally includes one or more of the first through sixth examples and further includes wherein controlling the speed of rotation of the compressor comprises adjusting a speed of rotation of a shaft coupling the turbine to the compressor via an electric motor.

An example of a system includes an engine coupled to an intake manifold and to an exhaust manifold; a branched exhaust line coupled to the exhaust manifold, the branched exhaust line comprising a first branch fluidically coupling the exhaust manifold to an inlet of a turbine, a second branch fluidically coupling the exhaust manifold to an emission control device, and a third branch fluidically coupleable to the first branch and to the second branch, the second branch also fluidically coupled to an outlet of the turbine; and a four-way exhaust control valve positioned at a junction between the first branch, the second branch, and the third branch, the four-way exhaust control valve adjustable to a first position establishing fluidic coupling between the exhaust manifold and the first branch and between the second branch and third branch, the four-way exhaust control valve also adjustable to a second position establishing fluidic coupling between the exhaust manifold and the second branch and between the first branch and third branch. In a first example, the system includes wherein the four-way exhaust control valve in the first position creates a first exhaust flow path from the exhaust manifold and through the turbine via the first branch, and from the turbine and through the catalyst via the second branch; the four-way exhaust flow control valve in the second position creates a second exhaust flow path from the exhaust manifold, through the catalyst, and then to the turbine via the second branch; and the first flow path includes exhaust gas entering the turbine via the inlet and exiting via the outlet and the second flow path includes exhaust gas entering the turbine via the outlet and exiting via the inlet. In a second example, the system optionally includes the first example and further includes a compressor coupled to the turbine via a shaft, the compressor positioned in an intake passage coupled to the intake manifold, the intake manifold coupled to a vacuum consumer via an ejector. In a third example, the system optionally includes one or more of the first through second examples and further includes a controller storing non-transitory instructions executable to: adjust a position of the four-way exhaust control valve to the first position responsive to engine load above a threshold load; and adjust a position of the four-way exhaust control valve to the second position responsive to engine load below the threshold load. In a fourth example, the system optionally includes one or more of the first through third examples and further includes an electric motor coupled to a shaft connecting the compressor to the turbine, and wherein the instructions are further executable to adjust a speed of the electric motor to adjust a speed of rotation of the compressor based on a target intake air mass flow. In a fifth example, the system optionally includes one or more of the first through fourth examples and further includes wherein when the four-way exhaust control valve is in the first position, fluidic coupling between the exhaust manifold and the second branch at the junction is blocked, and when the four-way exhaust control valve is in the second position, fluidic coupling between the exhaust manifold and the first branch at the junction is blocked.

Another example of a method includes, responsive to a first condition, operating an engine with boost pressure above a threshold level, the boost pressure generated via forward rotation of a compressor positioned in an intake upstream of the engine; and responsive to a second condition, operating the engine with intake manifold vacuum, the intake manifold vacuum generated via reverse rotation of the compressor, and supplying air flow to the engine via a vacuum consumer, the reverse rotation of the compressor driven by reverse rotation of a turbine coupled to the compressor. In a first example, the method includes, responsive to the first condition, adjusting a position of a four-way exhaust control valve to a first position and directing exhaust gas from the engine to the turbine via a first flow path through the four-way exhaust control valve to cause forward rotation of the turbine, the forward rotation of the turbine driving the forward rotation of the compressor; and responsive to the second condition, adjusting the position of the four-way exhaust control valve to a second position and directing exhaust gas from the engine to the turbine via a second flow path through the four-way exhaust control valve to cause the reverse rotation of the turbine. In a second example, the method optionally includes the first example and further includes adjusting a speed of the forward rotation and reverse rotation of the compressor via an electric motor based on a target intake air flow. In a third example, the method optionally includes one or more of the first and second examples and further includes responsive to the second condition, supplying vacuum to a vacuum consumer coupled to the intake manifold.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for expediting warm-up of an emission control device in a turbocharged engine system, comprising:
via a controller,
receiving input data from one or more sensors of an engine, and, based on the input data received, adjusting a valve and flowing exhaust gas from the engine first through the exhaust emission control device and then through a turbine to rotate the turbine in a reverse direction, the rotation of the turbine in the reverse direction generating intake manifold vacuum for a vacuum consumer via a compressor coupled to the turbine while the engine is operating.

2. The method of claim 1, wherein the flowing exhaust gas from the engine first through the emission control device and then through the turbine to rotate the turbine in the reverse direction is performed responsive to a second engine operating condition, and further comprising responsive to a first engine operating condition, adjusting the valve and flowing exhaust gas from the engine first through the turbine to rotate the turbine in a forward direction and then flowing the exhaust gas through the emission control device, the rotation of the turbine in the forward direction generating intake boost pressure via the compressor, wherein the first engine operating condition and the second engine operating condition are determined based on the input data received from the one or more sensors.

3. The method of claim 2, wherein the second engine operating condition comprises one or more of an engine cold start and an engine load below a threshold load, and wherein the first engine operating condition comprises the engine load greater than the threshold load, the engine cold start and the engine load determined based on the input data received from the one or more sensors.

4. The method of claim 2, wherein the valve is a four-way exhaust control valve, and wherein flowing the exhaust gas from the engine first through the turbine and then through the emission control device comprises flowing the exhaust gas through the four-way exhaust flow control valve in a first position, and wherein flowing the exhaust gas from the engine first through the emission control device and then through the turbine comprises flowing the exhaust gas through the four-way exhaust flow control valve in a second position, the four-way exhaust control valve positioned in the first position responsive to the first engine operating condition, and the four-way exhaust control valve positioned in the second position responsive to the second engine operating condition.

5. The method of claim 2, further comprising during the second engine operating condition, flowing the exhaust gas from the turbine, then through a muffler, and then to atmosphere, and during the first engine operating condition, flowing the exhaust gas from the emission control device, then through the muffler, and then to atmosphere.

6. The method of claim 1, wherein generating intake manifold vacuum for the vacuum consumer comprises generating intake manifold vacuum for a brake booster, wherein the rotation of the turbine in the reverse direction also rotates the compressor in a reverse direction, the rotation of the compressor in the reverse direction drawing air from the brake booster via an ejector.

7. The method of claim 1, further comprising, via the controller, controlling intake air flow by controlling a speed of rotation of the compressor.

8. The method of claim 7, wherein controlling the speed of rotation of the compressor comprises adjusting a speed of rotation of a shaft coupling the turbine to the compressor via an electric motor.

9. A method for controlling an engine, comprising:
via a controller of the engine,
adjusting a valve and operating the engine with boost pressure above a threshold level responsive to a first engine operating condition, the boost pressure generated via forward rotation of a compressor positioned in an intake upstream of the engine; and
adjusting the valve and operating the engine with intake manifold vacuum, the intake manifold vacuum generated via reverse rotation of the compressor, and supplying air flow to the engine via a vacuum consumer, the reverse rotation of the compressor driven by reverse rotation of a turbine coupled to the compressor responsive to a second engine operating condition, the first engine operating condition and the second engine operating condition detected based on input data of one or more sensors of the engine.

10. The method of claim 9, further comprising:
the valve being a four-way exhaust control valve; and
responsive to the first engine operating condition, adjusting a position of the four-way exhaust control valve to a first position and directing exhaust gas from the engine to the turbine via a first flow path through the four-way exhaust control valve to cause forward rotation of the turbine, the forward rotation of the turbine driving the forward rotation of the compressor; and
responsive to the second engine operating condition, adjusting the position of the four-way exhaust control valve to a second position and directing exhaust gas from the engine to the turbine via a second flow path through the four-way exhaust control valve to cause the reverse rotation of the turbine.

11. The method of claim 9, further comprising adjusting a speed of the forward rotation and reverse rotation of the compressor via an electric motor based on a target intake air flow.

12. The method of claim 9, further comprising responsive to the second engine operating condition, supplying vacuum to the vacuum consumer coupled to the intake manifold.

13. A system comprising:
an engine coupled to an intake manifold and to an exhaust manifold;
one or more sensors coupled to the engine;
a controller communicatively coupled to the one or more sensors;
a branched exhaust line coupled to the exhaust manifold, the branched exhaust line comprising a first branch fluidically coupling the exhaust manifold to an inlet of a turbine, a second branch fluidically coupling the exhaust manifold to an emission control device, and a third branch fluidically coupled to the first branch and to the second branch, the second branch also fluidically coupled to an outlet of the turbine; and
a four-way exhaust control valve positioned at a junction between the first branch, the second branch, and the third branch, the four-way exhaust control valve adjustable to a first position establishing fluidic coupling between the exhaust manifold and the first branch and between the second branch and the third branch, the four-way exhaust control valve also adjustable to a second position establishing fluidic coupling between the exhaust manifold and the second branch and between the first branch and the third branch, the four-way exhaust control valve adjusted to the first position via the controller responsive to detecting a first engine operating condition, and the four-way exhaust control valve adjusted to the second position via the controller responsive to detecting a second engine operating condition, the first engine operating condition and the second engine operating condition detected based on input data from the one or more sensors.

14. The system of claim 13, wherein:
the four-way exhaust control valve in the first position creates a first exhaust flow path from the exhaust manifold and through the turbine via the first branch, and from the turbine and through a catalyst via the second branch;
the four-way exhaust flow control valve in the second position creates a second exhaust flow path from the exhaust manifold, through the catalyst, and then to the turbine via the second branch; and
the first flow path includes exhaust gas entering the turbine via the inlet and exiting via the outlet and the second flow path includes exhaust gas entering the turbine via the outlet and exiting via the inlet.

15. The system of claim 13, further comprising a compressor coupled to the turbine via a shaft, the compressor positioned in an intake passage coupled to the intake manifold, the intake manifold coupled to a vacuum consumer via an ejector.

16. The system of claim 15, wherein the controller stores non-transitory instructions executable to:
adjust a position of the four-way exhaust control valve to the first position responsive to determining an engine load above a threshold load; and
adjust a position of the four-way exhaust control valve to the second position responsive to determining the engine load is below the threshold load, the engine load based on input data received via the one or more sensors.

17. The system of claim 16, further comprising an electric motor coupled to a shaft connecting the compressor to the turbine, and wherein the instructions are further executable to adjust a speed of the electric motor to adjust a speed of rotation of the compressor based on a target intake air mass flow.

18. The system of claim 13, wherein when the four-way exhaust control valve is in the first position, fluidic coupling between the exhaust manifold and the second branch at the junction is blocked, and when the four-way exhaust control valve is in the second position, fluidic coupling between the exhaust manifold and the first branch at the junction is blocked.

* * * * *